May 17, 1932. O. E. WOODWARD 1,858,318
TOBACCO PLANT TRANSPLANTER
Filed July 27, 1931
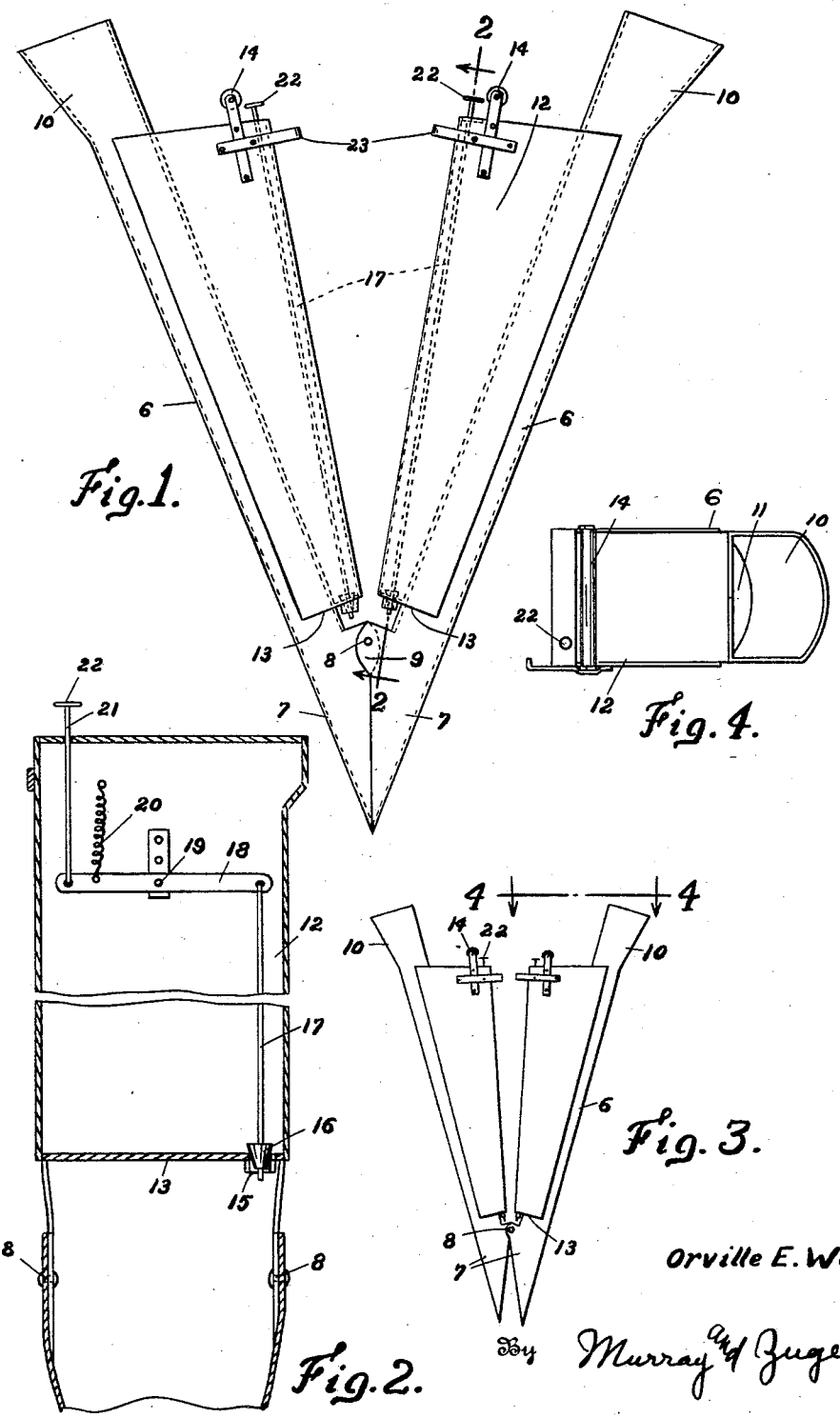
Inventor
Orville E. Woodward
By Murray and Zugelter
Attorneys Patented May 17, 1932

1,858,318

UNITED STATES PATENT OFFICE

ORVILLE E. WOODWARD, OF GERMANTOWN, KENTUCKY, ASSIGNOR OF ONE-HALF TO GEORGE W. HINSON, OF GERMANTOWN, KENTUCKY

TOBACCO PLANT TRANSPLANTER

Application filed July 27, 1931. Serial No. 553,271.

This invention relates to transplanting devices and has for its object the provision of an extremely simple and relatively inexpensive mechanism for the purpose.

Another object is to provide a device of this kind which requires a minimum of effort on the part of the operator and makes it possible for the operator to set the plants or stalks fast enough to keep two assistants busy feeding the plants to the device.

Another object is to provide a device which is especially arranged for use with a plurality of plant handling assistants and which is so arranged as to require a minimum of attention to the operation of the machine.

These and other objects are attained by the means described herein and disclosed in the accompanying drawings, in which:

Fig. 1 is a side elevational view of the device of the invention in closed position.

Fig. 2 is a view taken on line 2—2 of Fig. 1, part being broken away.

Fig. 3 is a view of the device in open position.

Fig. 4 is a view taken on line 4—4 of Fig. 3.

The device consists of a pair of uniform body members 6 which are developed at their lower ends into spades, 7 which, when the device is in a closed position will form a hollow point to be thrust into the ground. These spades are hingedly mounted together at 8—8, suitable perforate lugs 9 being provided at each side of each spade for effecting the hinged mounting.

The bodies being substantially identical, a description of one will suffice for both. Each body 6 is developed at its upper end, that is the end opposite the spade 7 into an open chute 10 and this, together with the body forms a continuous passage which terminates within the hollow interior of the spade 7. The body 6 is further provided with a casing 12 having a closed bottom at 13 and this provides a water supply tank for each body member. Secured across the top of each tank 12 is a handle 14, the pair of handles providing a grasping means for each hand of the operator with which the device may be lifted with the handles spread apart and the spades together and then thrust into the ground to form a hole. As may be best seen in Fig. 2, the bottom 13 has a discharge port 15 controlled by a valve 16. A rod 17 is secured on the valve 16 and extends along one side of the tank to a lever 18 which is pivoted at 19 on a suitable support on the tank wall. A spring 20 normally urges the lever 18 to a position wherein the rod 17 is seating valve 16. An actuating plunger 21 with a suitable thumb piece 22 affords a convenient means of releasing a small quantity of water into the hole made by the spades. The thumb pieces 22 are arranged conveniently adjacent the handles 14 so that they may be actuated by the operator without requiring him to release his grip on the handles 14. Suitable stops or guards 23 may be provided on adjacent sides of tanks 6 to limit the approach of the members toward one another and to provide a desirable spacing of the spades when the plant is being delivered to the hole made thereby.

In operation the tanks are filled with water and the operator then starts to reset a row of plants intermediate two existing overcrowded rows. An assistant accompanies him on either side and each removes a plant from the crowded row which he follows and in turn deposits it in the chute 10 closest to him. The operator of the device spreads the handles 14 apart to close the spades or digger and thrusts the device into the ground to make a hole. One assistant drops a plant into chute 10 at the operator's right-hand side, whereupon the operator presses the handles together to allow the plant to drop through and seat in the hole made by the spades. By depressing the thumb piece 22 he provides a small quantity of water for the deposited plant. Upon pulling the device out of the hole the dirt falls back about the roots of the plant. The operator then proceeds to make another hole and, upon deposit of the plant in chute 10 at his left side, he follows the same order of movements, except that he depresses the finger piece 22 on the left-hand side to water the plant. The device may be operated with ease and celerity so that it is not difficult for the operator of the device to keep two assistants busy lifting plants and dropping them in the chutes. In this way three men with one of these devices can accomplish with ease as much or more work than could be accomplished by a greater number of men using heretofore known devices.

What is claimed is:

1. A transplanter comprising a pair of uniform body members pivoted together adjacent the bottoms thereof, the bottoms of the members being developed into spade portions, a reservoir carried by each body member above the pivotal mounting, a handle member on each body member, an outlet valve in each reservoir discharging into the space between the spades and means disposed immediately adjacent each handle for actuating the valve in the respective reservoirs.

2. In a transplanter the combination of a pair of substantially uniform body members each comprising a chute and a spade, the body members being pivoted one on the other immediately above said spades, water reservoirs secured to said body members and forming closed chutes therewith, handles on the reservoirs for manipulating the body members about the pivotal mounting and valve means in the reservoirs and adapted for thumb actuation adjacent the handles on said reservoirs.

3. In a device of the class described the combination of a pair of uniform body members pivoted together adjacent the bottom thereof, said body members forming chutes and having the ends thereof below the pivotal mounting developed into cooperating spades, water tanks disposed one on each body and forming with the body a chute for plants discharging at substantially a common point between the spades, a valve in each tank discharging in the space between the spades, handle means for manipulating the bodies including the chutes, tanks and spades, and valve control means extending upwardly through the tanks for thumb actuation in the hands of the holder of the handles.

4. In combination a pair of substantially uniform members each comprising an elongated curved metallic member, said members each terminating in a spade structure, the members being pivoted one on the other at the top of the spade structures, water tanks secured between the curved sides of the respective metal members and forming tubular chutes therewith, said chutes extending above the tops of the water tanks, handle means disposed on each tank and means actuatable from each of the handles for effecting discharge of water from the respective tanks to the space between the spades.

5. In combination a pair of substantially uniform members each comprising an elongated curved metallic member, said members each terminating at their bottom ends in spade structures, the members being pivoted one to another at the top of said spade structures, water reservoir members secured between the curved sides of the respective metal members and forming tubular chutes therewith, and flared funnel-like members at the top of said chutes adjacent the top of said reservoir members.

In testimony whereof, I have hereunto subscribed my name this 23 day of July, 1931.

ORVILLE E. WOODWARD.